United States Patent [19]

Pletscher

[11] 4,301,951
[45] Nov. 24, 1981

[54] LUGGAGE CARRIER FOR ATTACHMENT OVER THE FRONT WHEEL OF A BICYCLE OR THE LIKE

[75] Inventor: Oskar Pletscher, Marthalen, Switzerland

[73] Assignee: Gebrüder Pletscher, Marthalen, Switzerland

[21] Appl. No.: 82,775

[22] Filed: Oct. 9, 1979

[30] Foreign Application Priority Data

Oct. 17, 1978 [CH] Switzerland ............... 10723/78

[51] Int. Cl.³ .............................................. B62J 9/00
[52] U.S. Cl. .................................. 224/32 R; 224/39; 403/370
[58] Field of Search .............. 224/30 R, 30 A, 31, 224/32 R, 32 A, 33 R, 33 A, 34–41; 248/225.3 A, 225.4, 226.1, 228; 269/217, 234; 280/202, 289 R, 289 A, 289 H; 403/230, 361, 370

[56] References Cited

U.S. PATENT DOCUMENTS

| 2,186,483 | 1/1940 | Guidetti | 403/230 X |
| 2,326,402 | 8/1943 | Smulski | 403/370 |
| 2,664,113 | 12/1953 | Dodge | 248/228 X |
| 2,673,055 | 3/1954 | Riemann | 248/225.4 |

FOREIGN PATENT DOCUMENTS

| 1580466 | 9/1969 | France | 224/30 |
| 526427 | 9/1972 | Switzerland | |
| 24417 | of 1911 | United Kingdom | 224/32 R |
| 22208 | of 1912 | United Kingdom | 224/39 |
| 212435 | 3/1924 | United Kingdom | 224/30 R |

Primary Examiner—Stephen Marcus
Attorney, Agent, or Firm—Werner W. Kleeman

[57] ABSTRACT

A luggage carrier intended to be attached over the front wheel of a bicycle contains an attachment device serving for the attachment of the luggage carrier at the steering fork head. To improve the torsional resistance of the luggage carrier and to be able to secure such luggage carrier also at the steering fork heads of existing vehicles without the need to disassemble any parts, the attachment device comprises two caps or hood members intended to engage about both shoulders of the steering fork head. Each of these caps can be fixedly clamped by means of a preferably wedge-shaped clamping body at the related shoulder of the steering fork head.

3 Claims, 3 Drawing Figures

1

LUGGAGE CARRIER FOR ATTACHMENT OVER THE FRONT WHEEL OF A BICYCLE OR THE LIKE

BACKGROUND OF THE INVENTION

The present invention relates to a new and improved construction of luggage carrier or the like intended to be secured over the front wheel of a bicycle, the luggage carrier being equipped with an attachment device formed thereat and intended to be attached at the steering fork head.

A prior art luggage carrier of this type is attached at the steering fork head by means of an attachment bracket or strap. This attachment bracket, in turn, is fixedly clamped at the pin or journal protruding forwardly from the center of the steering fork head and, as a general rule, also serving for mounting the brake jaws of the tire rim brakes. This prior art luggage carrier is not satisfactory because the attachment bracket, depending upon the loading of the luggage carrier, also is capable of hindering the proper functioning of the brake jaws. Additionally, the attachment bracket is only stable to a limited extent against torsion, so that the luggage carrier either can only be designed so as to have a very slight cantilever towards the front, or then, however, must possess two additional lateral support struts which have to be attached at the fork legs.

Furthermore, there is known from U.S. Pat. No. 611,256 a basket-shaped luggage carrier wherein only a part of the attachment device is intended to engage at the steering fork head. This part comprises a bracket which engages the central region of the steering fork head from the front at its top and bottom, without having to be fixedly clamped thereat. This bracket is formed at the frame of the base of the luggage carrier. The other part of the attachment device is formed by clamps secured at the upper edge of the luggage carrier, this edge confronting the handlebar. These clamps are fixedly clamped about both arms of the handlebar. While the bracket only supports the load transported by the luggage carrier at the steering fork head, the clamps fixedly clamped at the arms of the handlebar prevent any forward tilting of the luggage carrier. Without these clamps such luggage carrier, when loaded, would tilt towards the front, and as a result the bracket would detach from the steering fork head.

What has been stated above is equally applicable for the basket-shaped luggage carrier of U.S. Pat. No. 615,756. This luggage carrier is suspended by means of hooks at the arms of the handlebar. These hooks form the most important part of the attachment device of the luggage carrier. At the forward edge of the base of such luggage carrier there is hingedly connected one end of a traction or tension strut formed of intertwined wires. This traction strut is adjustable by means of a clamp in its length. The other end of the traction strut is wrapped about the steering fork head. The remaining part of the attachment device, constituted by such traction strut, only serves to prevent any detachment of the hooks which have been suspended at the arms of the handlebar. In any event this traction strut does not have assigned to it any supporting function.

Additionally, from U.S. Pat. No. 1,189,929 there is known to the art a construction of container-shaped luggage carrier which is secured at three locations at the bicycle. Firstly, it is secured at its rear, upper edge by means of brackets at the arms of the handlebar, secondly at its rear, lower edge by means of a hinge with a horizontal hinge pin directed transversely with respect to the direction of travel at the steering fork head, and thirdly, at the region of the front end of both lower side edges by means of hingedly connected strut pieces at the axle of the front wheel. This construction of attachment device thus comprises three parts which engage at different locations, and the hinge at the steering fork head apparently is only assigned the task, when the luggage carrier is loaded, of preventing forward tilting or pivoting of the support struts.

Moreover, from Swiss Pat. No. 526,427 there is known to the art an attachment device for a luggage carrier or a child's seat. This attachment device consists of a two-part clamp connected at the control head and not intended to be secured to the steering fork head. One part of this clamp has two cantilevers containing bores in which there can be inserted the downwardly flexed ends of the frame web of the luggage carrier or the child's seat, as the case may be. Since a luggage carrier which is attached in this manner does not participate in the steering deflections of the steering fork, downwardly depending luggage pieces can obstruct the steering deflections of the front wheel. Finally, in U.S. Pat. No. 605,188 there is likewise taught to the art a luggage carrier which is to be secured over the front wheel of a bicycle. This luggage carrier is attached at two locations at the bicycle. Firstly, it is secured by means of two clamps, each of which are fixedly clamped about the upper end of the leg of the steering fork, and, secondly, is attached to each side by means of a respective supporting strut which likewise is fixedly clamped by means of clamps at the lower ends of the legs of the steering fork.

With none of the previously discussed state-of-the-art luggage carriers, to the extent that such are even secured at the steering fork head, is the attachment constructed such that this attachment alone is capable of securing the loading surface of the luggage carrier in the desired position without there being required other types of attachment points, for instance at the handlebar, and whereby there is still left free the intermediate region of the steering fork head for the anchoring of the front wheel-fender or protective guard and the bearing pin or journal for the brake jaws of a possibly employed tire rim brake.

SUMMARY OF THE INVENTION

Therefore, with the foregoing in mind, it is a primary object of the present invention to provide a new and improved construction of luggage carrier for attachment over the front wheel of a bicycle or the like which is not associated with the afore-mentioned drawbacks and limitations of the prior art construction.

Another and more specific object of the present invention aims at the provision of a new and improved construction of a luggage carrier of the previously mentioned type which not only extensively avoids the disadvantages of the state-of-the-art luggage carriers, but is also appreciably more stable and can be retrofitted at any time at existing bicycles without dismantling of any other part and also can be assembled by untrained of unskilled individuals, without having to equip the steering fork head with new, special bores.

Yet a further significant object of the present invention is directed to the provision of a new and improved construction of luggage carrier for attachment over the front wheel of a bicycle or the like, which is relatively simple in construction and design, economical to manufacture, extremely reliable in operation, capable of positively supporting loads without obstructing the steering of the front wheel, requires very little skill in mounting the luggage carrier and can be fitted at existing bicycles or the like without any great problem.

Now in order to implement these and still further objects of the invention, which will become more readily apparent as the description proceeds, the proposed luggage carrier of the present development is manifested by the features that the attachment device comprises two caps or hood members each intended to engage about a shoulder of the steering column head. These caps can be fixedly clamped by means of a clamping body at the related shoulder of the steering column head.

The clamping body is advantageously of wedge-shaped configuration, so that the clamping action is shiftable into a clamping position by a linear displacement thereof, for instance by means of a threaded bolt. Additionally, each cap can possess a concave contact or impact surface engaging the related shoulder at its face which is forwardly situated with respect to the direction of travel and at the opposite side possesses an inclined guide surface for the wedge-shaped clamping body. This guide surface can be profiled or sectioned transversely with respect to the displacement direction of the clamping body and such can have a complementary profile or sectional shape.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a perspective fragmentary view illustrating the most important parts of a mounted luggage carrier and showing parts of the steering fork of the bicycle or the like;

DETAILED DESCRIPTION OF THE PREFERRED EMBODIMENTS

Figure 1:
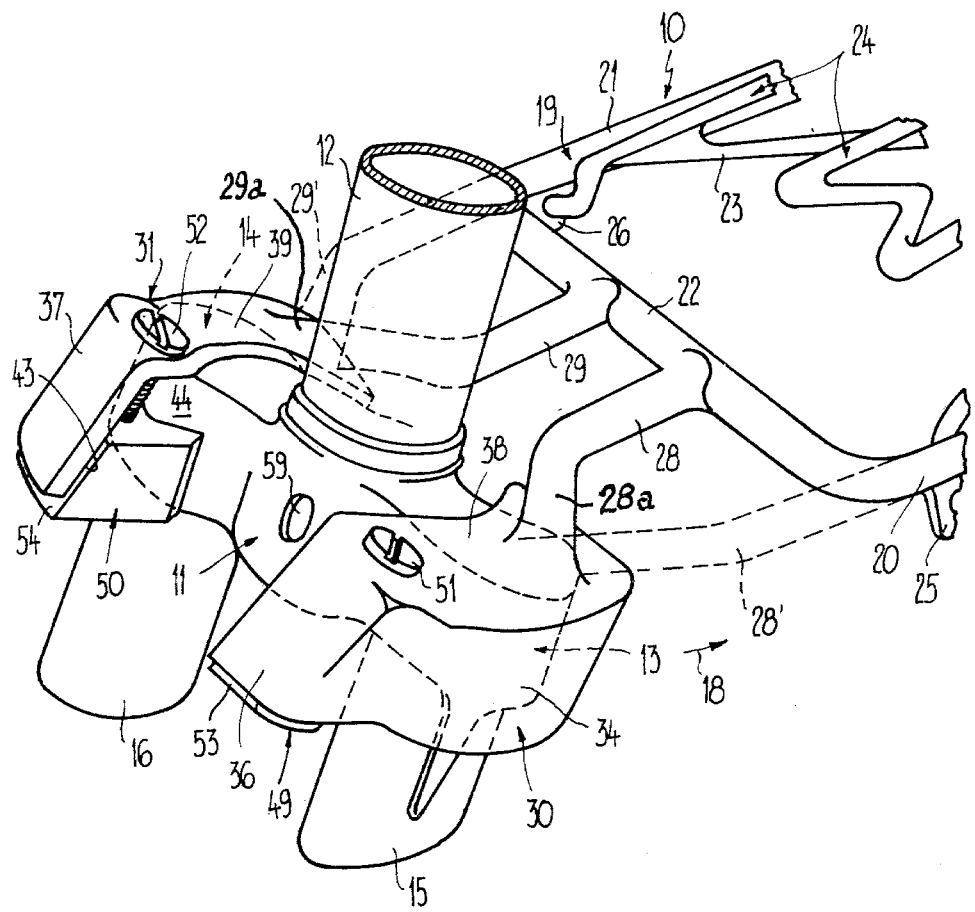

Describing now the drawings, the luggage carrier 10 illustrated by way of example therein, is mounted at the fork head 11 of the steering fork of a bicycle. The illustrated further parts of the steering fork are the following: the steering fork tube 12 and the fork legs 15 and 16 extending downwardly from both shoulders 13 and 14 of the fork head 11. At the lower ends of the fork legs 15 and 16 there is rotatably mounted the front wheel 17 of the bicycle, this wheel only having been shown in outline if FIG. 2 by the broken lines. The direction of travel of the bicycle has been indicated by the arrow 18.

The luggage carrier 10 comprises an essentially rectangular frame 19, constituting the loading surface. This frame 19 contains two longitudinal struts or bars 20 and 21 having a forward transverse strut or bar, not visible in the showing of the drawings and a rear transverse strut or bar 22. Additionally, the loading surface defined by the frame 19, as is usual, is subdivided into a grid or grate-like structure by rods formed at the longitudinal struts or bars 20 and 21 and/or at the transverse struts or bars 22. As to these rods in FIG. 1 there is shown only a single one of these rods 23, since the same is unimportant for understanding the teachings of the invention.

Now for the attachment of the luggage pieces which are to be carried by the luggage carrier 10 there can be provided a merely schematically indicated holder bracket 24. This holder bracket 24 is preferably pivotably mounted at the rear end of the longitudinal struts or bars 20 and 21 which are configured to possess downwardly protruding bearing eyelets 25 and 26 or equivalent structure, as the same has been clearly shown in FIGS. 1 and 2. This holder or retaining bracket 24 or equivalent structure can be resiliently pre-biased as is conventional with luggage carriers, or, as in the embodiment under discussion, can be used in conjunction with a separate rubber elastic, not particularly shown holder band for retaining the luggage pieces which are to be carried by the luggage carrier.

With the illustrated exemplary embodiment there are formed at the rear transverse strut or bar 22 two rearwardly extending cantilevers 28 and 29. At the free ends 28a and 29a of these cantilevers 28 and 29 there is formed a respective cap or hood member 30 and 31 engaging about the related shoulder 13 and 14 of the steering fork head 11. Each of these caps or hood members 30 and 31 possesses a front wall 32 and 33, a side wall 34 and 35 and rear wall 36 and 37 respectively, these walls being connected at their upper edges by a cover wall 38 and 39 which covers the corresponding fork shoulder 13 and 14 respectively. At such cover walls 38 and 39, in the embodiment under discussion, there are also formed the cantilevers 28 and 29, respectively. These cantilevers 28 and 29 of course also could be formed at the front walls 32 and 33 or also at the side walls 34 and 35, respectively. The caps or hood members 30 and 31 are thus open downwardly and at the confronting sides thereof.

Each of the concave configured inner surfaces 40 and 41 of the front walls 30 and 33 is structured as a contact or impact surface intended to snugly bear against the front surface portion of the related fork shoulders 13 and 14 respectively.

The inner surfaces 42 and 43 of the rear walls 36 and 37 do not extend parallel to the inner surfaces 40 and 41, rather diverge downwardly away therefrom, so that between these inner surfaces 42 and 43 and the rear flat part of the related fork shoulder 13 and 14 there remains free an essentially upwardly tapered intermediate space 44, FIG. 1 only showing one such intermediate space 44 for the cap or hood member 31. Additionally, there is formed in each of the inner surfaces 42 and 43 a guide groove 45 and 46, respectively.

Between each of the inner surfaces 42 and 43 and the confronting (rear) surface of the related fork shoulder 13 and 14 there is arranged an essentially wedge-shaped clamping body 49 and 50, respectively. Each clamping body 49 and 50 is provided with a related threaded bore 47 and 48. These clamping bodies 49 and 50 can be upwardly drawn or tightened by means of an associated tightening bolt or screw 51 and 52 to such an extent that each cap or hood member 30 and 31 is fixedly clamped upon the related fork shoulder 13 and 14, respectively. The rear surfaces 53 and 54 of the clamping bodies 49 and 50, and which rear surfaces confront the inner surface 42 and 43, are profiled or configured in section so that they are opposite or complementary to the inner surfaces 42 and 43. Also, the front surfaces 55 and 56 of the clamping bodies 49 and 50, and which front surfaces confront the rear surfaces of the related fork shoulders 13 and 14, are bent or flexed such that the clamping bodies 49 and 50, together with the front walls 32 and 33, correctly engage about the steering fork head 11 at the fork shoulders 13 and 14. This produces an extremely sturdy and torsion-resistant anchoring of the luggage carrier 10 at the steering fork head 11, and at the same time the front and rear bores 58 and 59 (FIG. 3) provided at the center of the steering fork head 11 and serving, on the one hand, for the reception of the attachment elements of the brake jaws and, on the other hand, the front wheel-guard or protective fender remain free and accessible. Additionally, the free overhang or cantilever of the luggage carrier 10 forwardly can be chosen to be appreciably greater due to the sturdy anchoring of the luggage carrier at the fork shoulders 13 and 14. Moreover, there is afforded the possibility of mounting additional, lateral support struts 59', as shown in FIG. 2, for accommodating particularly heavily loaded luggage carriers.

Figure 2:
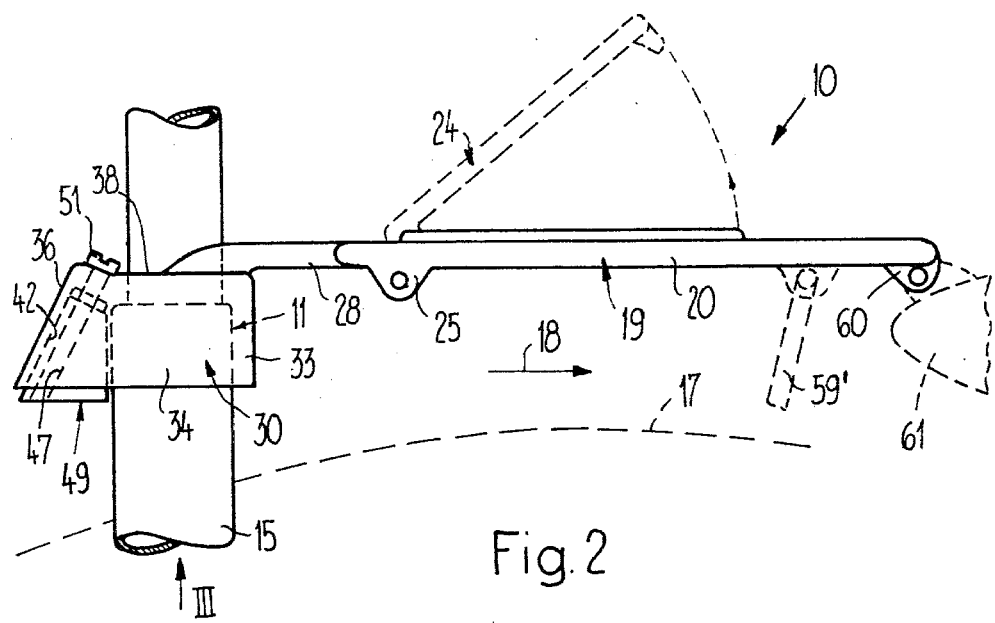
FIG. 2 is a side view of the luggage carrier according to FIG. 1.
Figure 3:
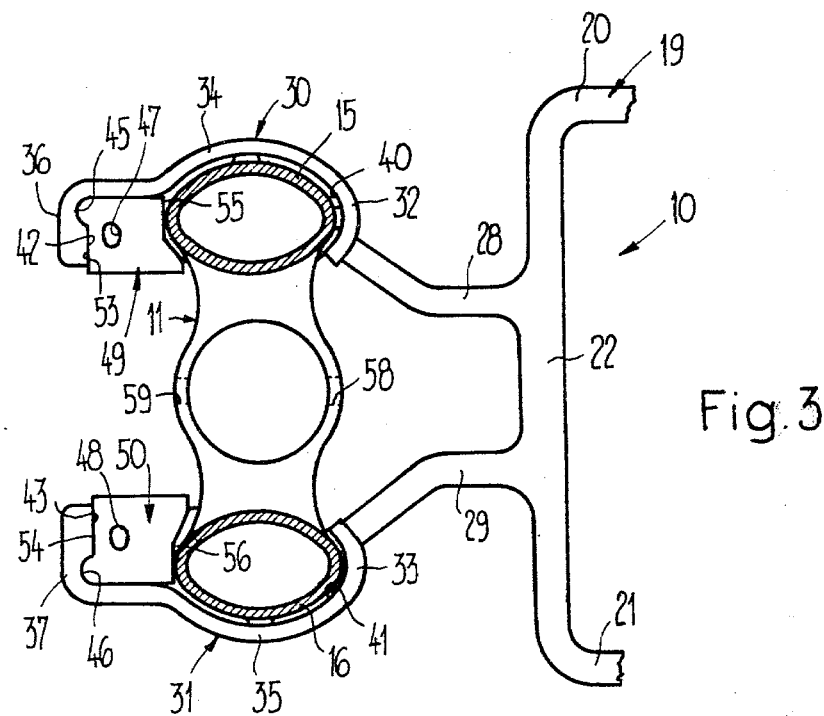
FIG. 3 is a view, looking in the direction of the arrow III of FIG. 2, of the mounted luggage carrier.

At the center of the front transverse strut it is possible, as shown in FIG. 2, to form a further downwardly protruding bearing eyelet 60 or equivalent structure, which, for instance, can serve for the attachment of a bike light or other illumination device 61.

Certain types of bicycles, particularly those of a lightweight construction, are equipped with so-called center traction cable-tire rim brakes, wherein the traction cable, for the purpose of actuating the brake jaws, is not directed laterally, rather centrally, and specifically, at a not particularly shown pivot pin or journal of the standard brake jaws and which pivot pin is anchored in the bore 58. As to bicycles equipped with such type brakes the cantilevers 28 and 29 which originate at the transverse strut or bar 22 and diverge rearwardly towards the caps or hood members 30 and 31 could hinder the brake jaws. In this case it is also possible to structure the cantilevers to a certain extent as extensions of the longitudinal or lengthwise struts 20 and 21, as has been shown in phantom lines in FIG. 1 and designated by reference characters 28' and 29', respectively.

Finally, it is mentioned that in the context of this disclosure the term "bicycle" is to be understood as being employed in its broadest sense since the luggage carrier could be conceivably used with other types of vehicles having two wheels in tandem.

While there are shown and described present preferred embodiments of the invention, it is to be distinctly understood that the invention is not limited thereto, but may be otherwise variously embodied and practiced within the scope of the following claims. Accordingly

What I claim is:

1. A luggage carrier, comprising:
    a carrier frame;
    an attachment means for securing the luggage carrier over a front wheel of a bicycle having a steering fork;
    said steering fork including a fork head with two shoulders and two fork legs secured at their upper ends to a respective one of said shoulders;
    said attachment means including two cap members integrally connected to said carrier frame, each of said cap members having a top wall and side walls;
    each cap member being intended to engage over and about a respective shoulder of said fork head;
    clamping means, associated with each of said cap members, for fixedly clamping the associated cap member at the related shoulder of said fork head;
    said clamping means including a clamping wedge having a narrow upper and a broad lower end;
    each cap member possessing at its side walls an inner concave contact surface engaging about the related shoulder at a surface thereof;
    said inner concave contact surface being located forwardly in the direction of travel of the bicycle;
    each cap member further possessing at its opposite side an inclined guide surface for said clamping wedge;
    said guide surface diverging downwardly away from the related fork leg;
    each of said clamping wedges including a threaded bore extended downwardly from the narrow upper end thereof; and
    said clamping means including bolt means for extending through the top wall of the respective cap member and being screwed into the threaded bore of the respective clamping wedge for displaceably shifting said wedge into its clamping position.

2. The luggage carrier, as defined in claim 1, wherein:
    said threaded bore in said clamping wedge extends substantially parallel to said guide surface.

3. The luggage carrier as defined in claim 1, wherein:
    each guide surface is profiled transversely with respect to the displacement direction of the clamping wedges; and
    each of said clamping body wedges being profiled in substantially complementary fashion at its surface bearing against the related guide surface.

* * * * *